April 29, 1969    P. BUCHER    3,441,218
ADJUSTABLE NOZZLE FOR JET PROPULSION ENGINE
Filed Nov. 7, 1966    Sheet 1 of 4

INVENTOR
Paul Bucher
BY Polachek & Saulsbury
ATTORNEYS

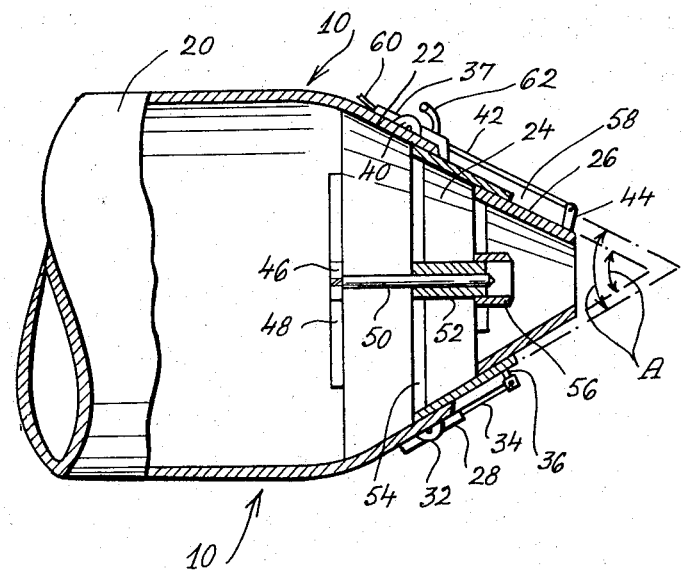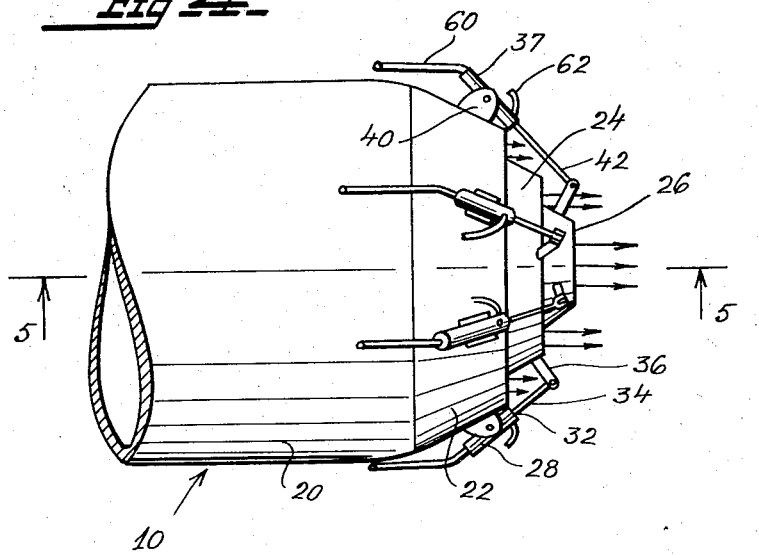

INVENTOR
Paul Bucher
BY
ATTORNEYS

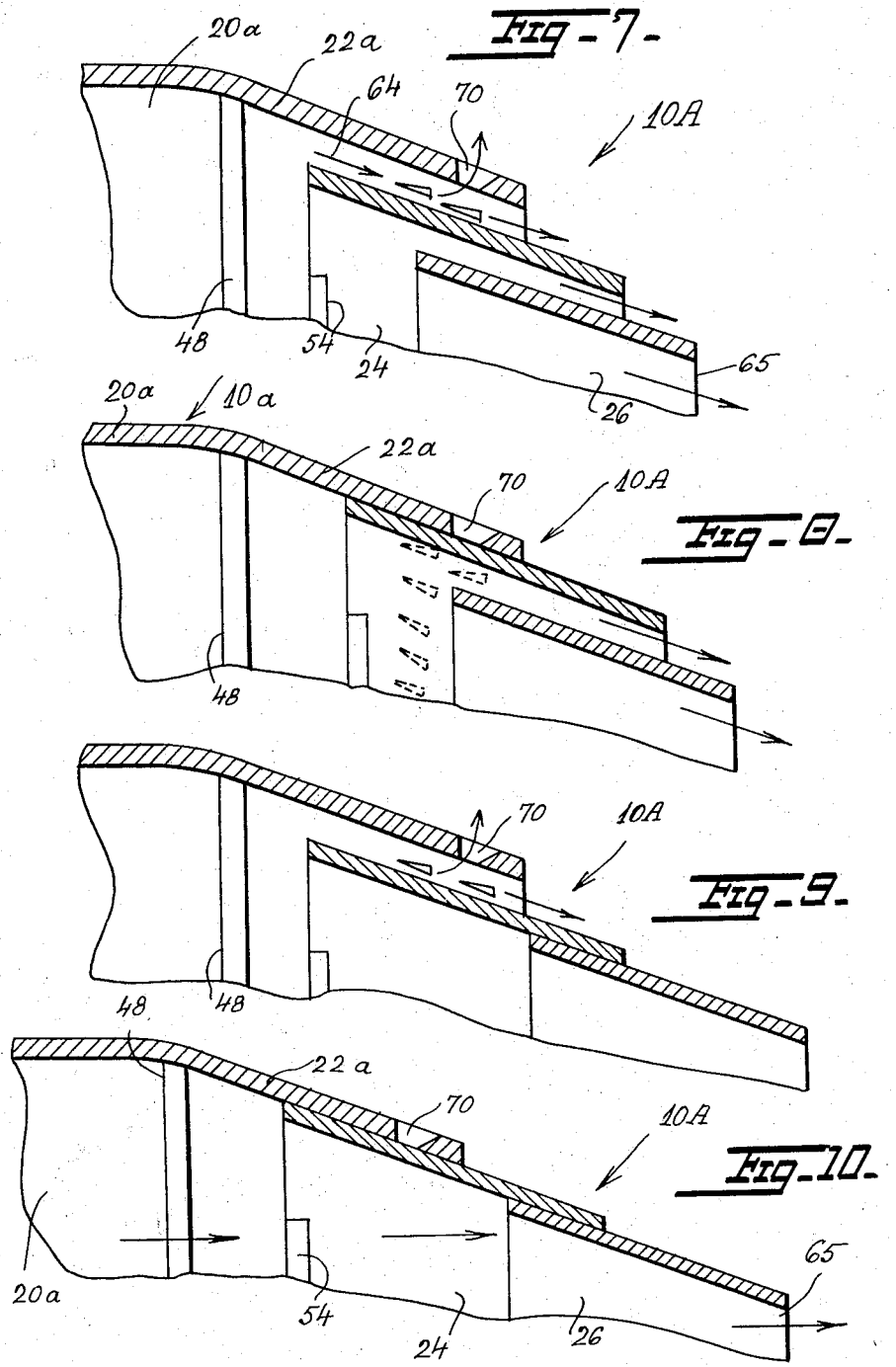

United States Patent Office 3,441,218
Patented Apr. 29, 1969

3,441,218
ADJUSTABLE NOZZLE FOR JET PROPULSION
ENGINE
Paul Bucher, 68—19 31st Ave.,
Jackson Heights, N.Y. 11372
Filed Nov. 7, 1966, Ser. No. 592,635
Int. Cl. F02k 1/08
U.S. Cl. 239—265.25          10 Claims

ABSTRACT OF THE DISCLOSURE

An adjustable nozzle construction for a jet engine. The nozzle construction is progressively adjusted between a maximum thrust position and a minimum thrust position. Means is provided for instituting and adjusting drag to facilitate smooth control of jet propulsive thrust of the engine. The exhaust nozzle includes axially movable frusto-conical rings for adjusting propulsive thrust of the jet propulsion unit. A tapered frusto-conical rear end section is provided on a cylindrical exhaust tube. A first frustro-conical ring is movably disposed in the rear end section and has a narrow rear end extending rearwardly beyond the rear end section of the tube. A second frusto-conical ring is disposed similarly to the first frusto-conical ring in alignment with the first ring with a narrow rear end extending rearwardly beyond the end of the first ring. Motor means is operatively connected to the first and second rings for independently and selectively extending the rings rearwardly and retracting the rings forwardly to provide exhaust openings of controllable size, whereby the propulsive thrust is determined by the relative positioning or the rings axially of the tube and of each other.

---

One object of the invention is to provide an adjustable nozzle construction for a jet engine, in which the nozzle can be progressively adjusted between a maximum thrust position and a minimum thrust position.

A further object is to provide an adjustable nozzle construction as described, with means for instituting and adjusting drag to facilitate smooth control of jet propulsive thrust of the engine.

Still another object is to provide a jet propulsion unit with an exhaust nozzle including axially movable frusto-conical rings for adjusting propulsive thrust of the unit.

Another object is to provide a jet propulsion unit as described with lateral openings for causing drag, and means for adjustably closing the openings to regulate the drag.

Other objects are to provide adjustable means for improving the efficiency of operation of a jet propulsion engine; and to provide an adjustable exhaust nozzle which performs sound muffling functions.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 3 is a longitudinal sectional view taken on line 3—3 of FIG. 1.

FIG. 4 is a side view similar to FIG. 1, with the nozzle assembly shown in retracted position.

FIG. 7 is an enlarged fragmentary sectional view taken on line 7—7, showing the nozzle assembly in fully retracted position.

FIGS. 8 and 9 are two sectional views similar to FIG. 7, showing the nozzle assembly in two different intermediate positions.

FIG. 10 is a sectional view similar to FIGS. 7–9, showing the nozzle assembly in fully extended position.

Figure 1:
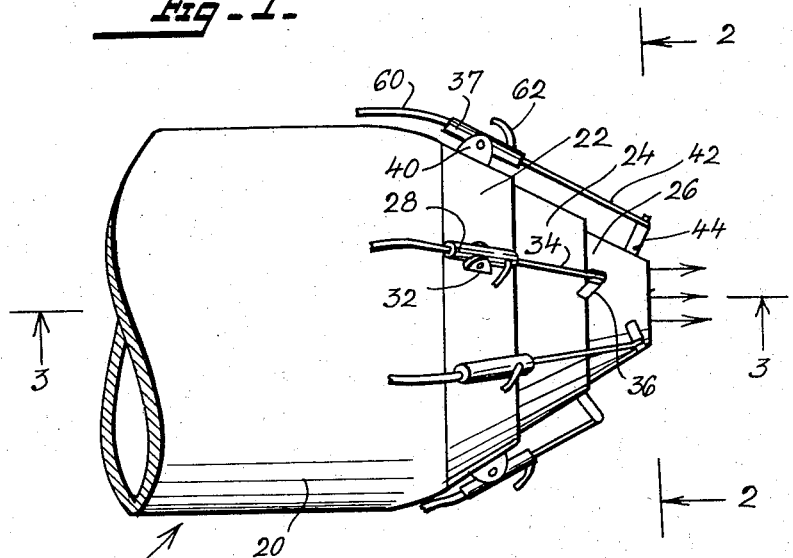
FIGURE 1 is a side view of part of a jet propelled unit equipped with a nozzle assembly embodying the invention, the assembly being shown in extended position.

Referring first to FIGS. 1–5 there is shown part of an exhaust tube 20 of a jet propulsion unit 10. The tube 20 has a generally conical open rear end section 22. A frusto-conical ring 24 is axially aligned with tube 20 and is axially movable in end section 22 of the tube. A second ring 26 of smaller size is axially aligned with tube 20 and ring 24 and is disposed in ring 24.

Ring 24 is movable axially by a plurality of hydraulic motors 28 pivotally mounted on brackets 32 attached to tube section 22. The motors are spaced apart 120° circumferentially of the tube. Their piston shafts 34 are pivotally engaged on arms 36 projecting radially outward of ring 24.

Ring 26 is movable axially by a plurality of hydraulic motors 37 pivotally mounted on brackets 40 attached to tube section 22. Motors 37 are also spaced apart 120° circumferentially of the tube and have long piston shafts 42 engaged on arms 44 attached to ring 26.

Inside tube section 22 is a ring 46 supported centrally of the tube by radial spider arms 48. Extending rearwardly from ring 46 axially of the tube is a shaft 50. Shaft 50 extends through ring 24 and partially through ring 26. A short sleeve 52 is centrally supported by radial arms 54 in ring 24. This sleeve is slidably disposed on shaft 50 which extends through the sleeve. A second sleeve 56 is centrally supported by radial arms 58 in ring 26. Sleeve 54 is slidably disposed inside of sleeve 56. By the arrangement described, ring 24 surrounds the forward part of ring 26 which projects rearwardly out of ring 24. Tube section 22 surrounds the forward part of ring 24 which projects rearwardly of the tube section 22.

Figure 2:
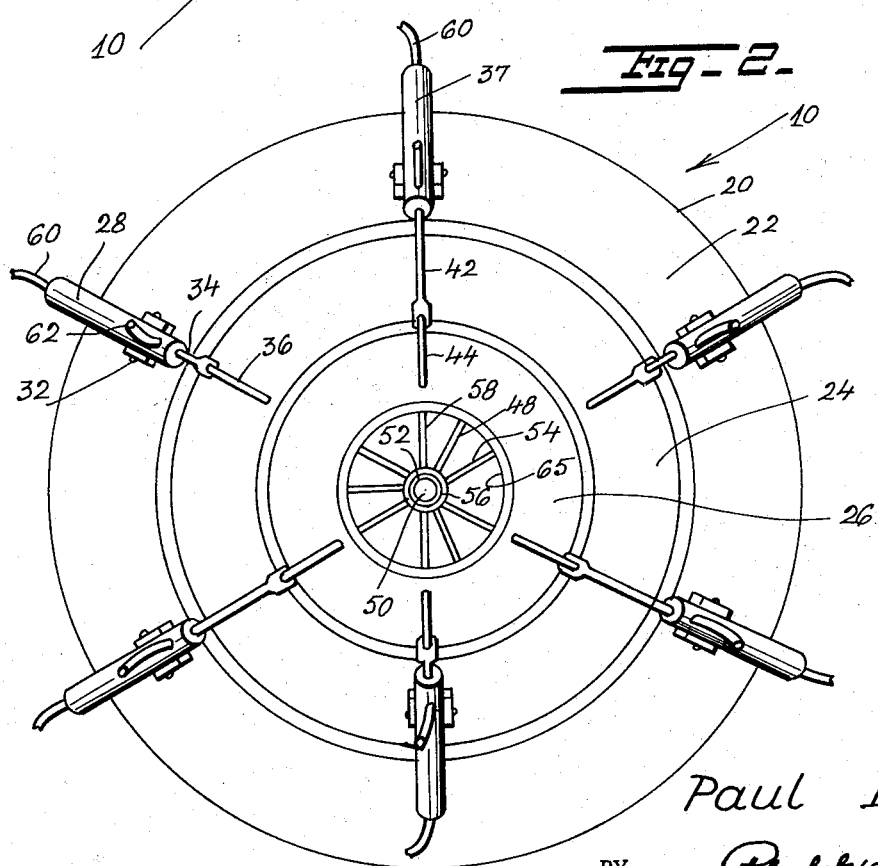
FIG. 2 is an enlarged elevational end view taken on line 2—2 of FIG. 1.

In the position of the rings shown in FIGS. 1–3, the rings are fully extended by the hydraulic motors. Each motor has two spaced hydraulic lines 60, 62 connected thereto for driving the piston shaft rearwardly and for retracting the shaft when fluid in the lines is driven into and out of the motor from a forwardly controlled fluid supply (not shown). In the extended position of the rings, the nozzle assembly including the rings and tube section has a rear opening 65 of minimum size limited only to the opening in ring 26. Thus the exhaust gas has maximum velocity at this point and consequently maximum forward thrust is applied to the unit of which tube 20 is a part.

Figure 5:
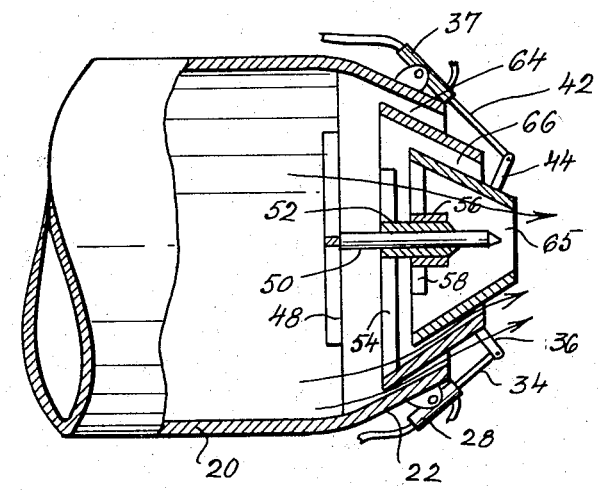
FIG. 5 is a longitudinal sectional view similar to FIG. 3, but taken on line 5—5 of FIG. 4.
Figure 6:
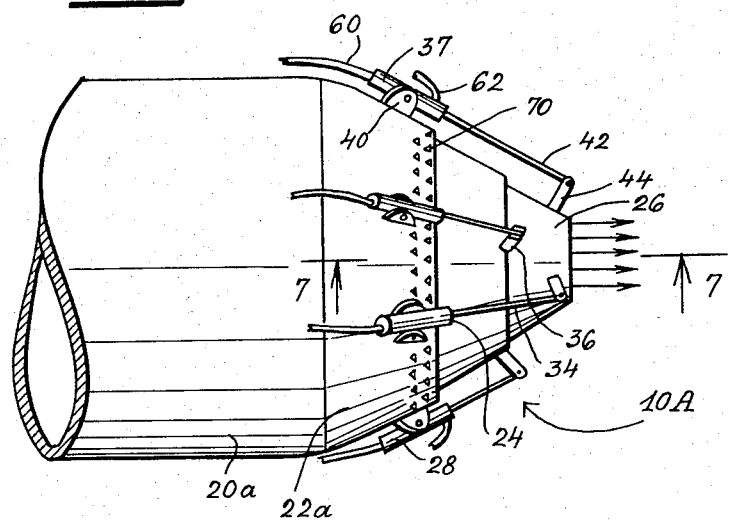
FIG. 6 is a side view similar to FIG. 1, showing another nozzle assembly.

In the fully retracted positions of the rings shown in FIGS. 4 and 5, annular channel 64 is open between ring 24 and tube section 22. Another annular channel 66 is open between rings 24 and 26. The rear and exhaust outlet of tube 20 is enlarged by channels 64 and 66 so that the expulsion velocity of exhaust gas is less than in the fully extended positions of the rings, and forward thrust of tube 20 is minimum. The motors 28 and 37 can be selectively operated so that at intermediate positions either one of channels 64, 66 can be opened to greater or lesser extent as desired. Thus a smooth adjustment can be effected between minimum and maximum exhaust openings for varying the forward thrust of the propulsion unit. The centered fixed shaft 50 and sleeves 52, 56 keep the rings properly centered within the tube. The rings and tube section 22 have the same apical angle A and have such sizes that when fully extended they laterally abut each other and ring section 22 to close off both annular channels 64, 66.

In FIGS. 6–10 is shown part of another propulsion unit 10A which is generally similar to unit 10 and corresponding parts are identically numbered. In tube section 22a of tube 20a there are provided lateral ports or vents 70 spaced apart circumferentially of the ring section. The ports are disposed near the rear end of the ring section 22a so that they will be closed when ring 24 is fully extended rearwardly as shown in FIGS. 8 and 10. When ring 24 is partially or fully retracted as shown in FIGS. 7 and 9, then some exhaust gas is discharged laterally of the tube and causes a drag which effectively slows down forward thrust. When ring 24 closes the ports 70 while ring 26 is partially or fully retracted as shown in FIG. 10, this constitutes an intermediate position of the nozzle assembly. Then there is no lateral discharge and no drag but forward thrust is less than maximum because channel 66 is open between rings 24 and 26. When ring 26 is fully extended from ring 24 as shown in FIG. 9, while ring 24 is partially or fully retracted, this constitutes another intermediate position with some lateral discharge and drag subtracting from the intermediate forward thrust due to fully open ring 26 and annular channel 64 between ring 24 and tube section 22a. The sets of motors moving rings 24, 26 are independently adjustable so either or both rings can be extended or retracted.

The rings 24, 26 of propulsion unit 10 shown in FIGS. 1–5 are also disposable in the plurality of intermediate positions shown in FIGS. 8 and 9, except that there will be no lateral exhaust gas discharge and thus no drag. In general, for vehicles which must be driven at optimum speeds which minimum drag, such as military aircraft, the ports 70 will be reduced in number or omitted. In any case the invention provides means for selectively controlling forward thrust and drag by adjustably positioning the rings 24, 26 axially of the propulsion unit.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. An adjustable nozzle assembly for a jet propulsion unit having a cylindrical exhaust tube through which engine exhaust gases discharge for providing forward propulsive thrust; said assembly comprising a tapered frusto-conical rear end section on said tube, a first frusto-conical ring movably disposed in said end section of the tube in axial alignment therewith and having a narrow rear end extending rearwardly beyond said end section of the tube, a second frusto-conical ring movably disposed in said end section of the tube in axial alignment therewith and having a narrow rear and extending rearwardly beyond the end of the first frusto-conical ring, and motor means carried by said tube and operatively engaged with both of said rings for independently and selectively extending the rings rearwardly and retracting the rings forwardly to provide exhaust openings of controllable size, whereby the propulsive thrust is determined by the relative positioning of the rings axially of said tube and of each other.

2. An adjustable nozzle assembly according to claim 1, further comprising means for holding the rings in axial alignment with the tube in all relative axial positions of the rings.

3. An adjustable nozzle assembly according to claim 1, wherein the same apical angle is defined by the rings and ring section so that in the fully extended positions of the rings, the outer side of the first ring snugly engages the inside of the ring section and the outer side of the second ring snugly engages the inside of the first ring, whereby the opening in the second ring is then the only outlet for discharge gas so that maximum forward propulsive force is exerted on said unit, and whereby annular channels are open between the first ring and ring section, and between the first and second rings when the rings are retracted with respect to the tube.

4. An adjustable nozzle assembly as recited in claim 1, wherein said ring section has a multiplicity of circumferentially disposed ports for passing exhaust gas laterally out of the tube to exert a drag upon said unit.

5. An adjustable nozzle assembly as recited in claim 2, wherein said holding means for the rings comprises an axial shaft supported in a fixed position in said ring section and extending rearwardly through the aligned first and second rings, a first sleeve centrally supported in the first ring and slidably engaged on said shaft, and a second sleeve centrally supported in the second ring and slidably engaged on the first sleeve, whereby the rings are held in fixed concentric position in the ring section in all axial positions of the rings.

6. An adjustable nozzle assembly as recited in claim 3, wherein said ring section has a multiplicity of circumferentially disposed ports for passing exhaust gas laterally out of the tube to exert a drag upon said unit.

7. An adjustable nozzle assembly as recited in claim 5, wherein the same apical angle is defined by the rings and ring section so that in the fully extended positions of the rings, the outer side of the first ring snugly engages the inside of the ring section and the outer side of the second ring snugly engages the inside of the first ring, whereby the opening in the second ring is then the only outlet for discharge gas so that maximum forward propulsive force is exerted on said unit, and whereby annular channels are open between the first ring and ring section, and between the first and second rings when the rings are retracted with respect to the tube.

8. An adjustable nozzle assembly as recited in claim 2, wherein the same apical angle is defined by the rings and ring section so that in the fully extended positions of the rings, the outer side of the first ring snugly engages the inside of the ring section and the outer side of the second ring snugly engages the inside of the first ring, whereby the opening in the second ring is then the only outlet for discharge gas so that maximum forward propulsive force is exerted on said unit, and whereby annular channels are open between the first ring and ring section, and between the first and second rings when the rings are retracted with respect to the tube.

9. An adjustable nozzle assembly as recited in claim 1, wherein said motor means comprises a first plurality of hydraulic motors pivotally mounted on the tube in circumferentially spaced positions and having piston shafts pivotally engaged with the first ring, and a second plurality of hydraulic motors pivotally mounted on the tube in other circumferentially spaced positions and having piston shafts pivotally engaged with the second ring, whereby the two rings are independently movable independently of each other axially of the tube.

10. An adjustable nozzle assembly as recited in claim 7, wherein said motor means comprises a first plurality of hydraulic motors pivotally mounted on the tube in circumferentially spaced positions and having piston shafts pivotally engaged with the first ring, and a second plurality of hydraulic motors pivotally mounted on the tube in other circumferentially spaced positions and having piston shafts pivotally engaged with the second ring, whereby the two rings are independently movable independently of each other axially of the tube.

References Cited

UNITED STATES PATENTS

| 2,408,099 | 9/1946 | Sherman | 239—265.19 |
|---|---|---|---|
| 2,557,435 | 6/1951 | Imbert | 239—265.25 |
| 2,585,270 | 2/1952 | Plath | 239—265.25 |

EVERETT W. KIRBY, *Primary Examiner.*

U.S. Cl. X.R.

239—265.13